United States Patent
Schnur et al.

(10) Patent No.: US 6,283,636 B1
(45) Date of Patent: Sep. 4, 2001

(54) METHOD FOR CHANGING THE CLAMPING CONDITIONS OF A ROTATABLE PART AS WELL AS A ROTATABLE PART

(75) Inventors: Juergen Schnur, Ditzingen; Silvia Tomaschko, Ulm, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/329,789

(22) Filed: Jun. 10, 1999

(30) Foreign Application Priority Data

Jun. 13, 1998 (DE) .............................................. 198 26 174

(51) Int. Cl.$^7$ ........................................................ F16C 19/06
(52) U.S. Cl. ................................................................ 384/517
(58) Field of Search .................................... 384/517, 518, 384/563, 448, 519

(56) References Cited

U.S. PATENT DOCUMENTS

| | | |
|---|---|---|
| 4,850,719 | 7/1989 | Moseley et al. . |
| 5,221,146 | 6/1993 | Maruyama . |
| 5,332,061 | 7/1994 | Majeed et al. . |
| 5,434,783 | 7/1995 | Pal et al. . |
| 5,564,840 | 10/1996 | Jurras, III et al. . |

FOREIGN PATENT DOCUMENTS

| | | |
|---|---|---|
| 31 23 590 | 1/1983 | (DE) . |
| 36 06 042 | 9/1986 | (DE) . |
| 38 10 448 | 10/1988 | (DE) . |
| 39 00 121 | 7/1990 | (DE) . |
| 93 01 334 | 5/1993 | (DE) . |
| 42 27 366 | 2/1994 | (DE) . |
| 195 31 402 | 2/1997 | (DE) . |
| 195 41 245 | 5/1997 | (DE) . |
| 695 08 203 | 7/1999 | (DE) . |
| 0 377 145 | 7/1990 | (EP) . |
| 61-127922 | 6/1986 | (JP) . |
| 1-266320 | 10/1989 | (JP) . |

*Primary Examiner*—Lenard A. Footland
(74) *Attorney, Agent, or Firm*—Crowell & Moring LLP

(57) ABSTRACT

The invention relates to a method for changing the clamping conditions of a rotatable part, which is rotatably disposed in the shaft bearing, and in the case of which the axis of rotation of the rotatable part is arranged axially identically with the axis of rotation of the shaft bearing. For changing a sound effect emanating from the rotatable part, the axial and radial clamping conditions between the shaft bearing and a rotatable part rotatably held in the shaft bearing, particularly of a shaft, of the engine, are changed in a controllable manner. Likewise, the transmission function of the vibrations, particularly of vibrations generating sound waves, existing between the rotatable part and the shaft bearing or a component contacting the shaft bearing is changed.

11 Claims, 5 Drawing Sheets

METHOD FOR CHANGING THE CLAMPING CONDITIONS OF A ROTATABLE PART AS WELL AS A ROTATABLE PART

This application claims the priority of German application No. 198 26 174.8, filed in Germany on Jun. 13, 1998.

BACKGROUND AND SUMMARY OF THE INVENTION

The invention relates to a method for changing the clamping conditions of a rotatable part which is rotatably disposed in the shaft bearing, and in the case of which the axis of rotation of the rotatable part is arranged axially identically with the axis of rotation of the shaft bearing, as well as to a rotatable part which is rotatably disposed in a shaft bearing and whose axis of rotation is arranged axially identically with the axis of rotation or axis of symmetry the shaft bearing, and having an adjusting unit for compensating a play of the rotatable part.

In machine construction, rotatable parts are generally rotatably held by means of shaft bearings or pivot bearings, such as ball bearings, tapered-roller bearings, slide bearings, etc. In the case of rotatable part/shaft bearing connections, changes of the clamping conditions, as, for example, a play, may occur. The changes are generally not static but may change, particularly as a result of thermal effects. Various effects are connected with the change of the clamping conditions of the rotatable part in the shaft bearing. Thus, particularly the natural frequencies and/or the vibration amplitudes of the rotatable part will change. Sometimes, a compensation of the occurring changes will be achieved in that the rotatable part/shaft bearing connection is prestressed particularly by a spring or by an elasticity of the material, the prestressing partially affecting bearing shells.

Compensation arrangements of this type are known, for example, from German Patent Documents DE 195 41 245 A1, DE 38 10 448 C2, DE 93 01 334 U1 or DE 31 23 590 A1.

Furthermore, machines having rotating parts have at least usually a certain disturbing noise sound effect. One reason for these disturbing noises is, among others, that the rotating rotatable parts, particularly shafts, introduce vibrations into other components. Resonance frequencies are important for the transmission of vibrations between components and for the introduction of vibrations from one component to another component, The mathematical relationship of this frequency-dependent transmission is called transmission function.

From U.S. Patent Document 5,332,061 A1, a method is known for suppressing vibrations introduced into the vehicle body as well as a corresponding vehicle. The concerned introduced vibrations originate from the engine and, in this case, particularly from the moving parts, such as the rotating crankshaft or camshaft. The vibrations are transmitted at the connection points of the engine with the vehicle body. For damping these vibrations, the vehicle has shakers, thus, mechanical vibration exciting devices which are arranged in the area of at least some connection points of the engine with the vehicle body. During the operation of the engine, the shakers are excited as a function of the rotational speed of the engine at the resonance frequencies in antiphase to the vibrations coming from the engine, whereby the transmission of the introduced vibrations is at least dampened. In this case, the corresponding frequencies and their amplitudes for the artificial secondary vibrations introduced in a targeted manner are taken from a previously filed data field.

From U.S. Patent Document U.S. Pat. No. 5,434,783 A1, a vehicle is known, in the case of which the sound effect audible inside the occupant compartment is influenced by sound waves. In addition to normal loudspeakers, a piezoelement is also used here which excites the vehicle body at least in areas to carry out vibrations and thereby causes it to emit sound waves; that is, the piezoelement acts like the coil of a loudspeaker while the vehicle body represents the vibrating membrane. By means of the known method and the known system, an improvement of the subjective sensation inside the occupant compartment is achieved.

A further development of the above system for influencing the subjectively perceived driving sensation is known from German Patent Document DE 195 31 402 A1. According to this document, as a function of a parameter and in this case particularly of the rotational engine speed and/or the vehicle speed, not only the airborne sound but also the structure-borne sound or vibrations perceived by the body are influenced. For this purpose, depending on the size of the parameters, certain data are read out of a data field and, by means of vibration exciting devices are converted to artificial vibrations which, among others, can also be perceived by the body. As a result of these measures, in conjunction with the influencing of the acoustically perceived airborne sound, positive as well as negative interferences of the targeted introduced artificial secondary vibrations can be generated with the primary vibrations which occur on the vehicle side when the vehicle is operated. As desired, the interferences can reduce the perceived impression or simulate a certain impression, for example, a shifting in the case of a vehicle provided with an infinitely variable speed transmission.

It is an object of the invention to develop a method by means of which the perceivable vibrations of an engine having rotating rotatable parts and, at the same time, a possibly occurring axial play can be at least reduced. Furthermore, it an object of the invention to suggest a new system by means of which perceivable vibrations and, at the same time, a possibly occurring axial play can be at least reduced.

According to the invention, the object is achieved by means of a shaft bearing.

As a result of the targeted and reversible change of the radial course of a radial adjusting unit particularly having piezoelements and of the contact pressure radially affecting the rotatable part, the clamping conditions can be changed during the operation by a targeted intervention from the outside.

The changing of the clamping conditions has, for example, the result that the values of the inherent vibrations of the rotatable part and also the transmission function from the rotatable part to another component are changed. As the result of the change of the transmission function, the transmission of vibrations, thus of the transmittable energy, coming from the rotatable part, into another component are changed, particularly at least reduced.

In the case of the radial adjusting unit, the intervention takes place by the application of an electric voltage. This measure leads to a change of the resonance or natural frequencies of the rotatable part and also to a change during the transmission and introduction of vibrations. The respective resonance frequencies are important for the transmission of vibrations between components and for the introduction of vibrations from one component to another component, The mathematical relationship of this frequency-dependent energy transmission or vibration transmission is called transmission function.

In addition, In the above-mentioned manner, for example, a play, which changes because of temperature influences, can occur during the operation of the rotatable part. This is meaningful, for example, for a compensation of the play.

In a preferred manner, this is expedient in the case of a crankshaft and/or camshaft of an internal-combustion engine, preferably a diesel engine or gasoline engine, as a rotatable part because, in a simple fashion, the introduced vibrations and of these particularly the sound emission inside an occupant compartment of a combustion-engine-driven vehicle can be influenced.

This method and this arrangement can expediently be used in the case of rotatable parts of electric motors, as particularly rotors, but also in airplane engines, for example, jet engines or propellers.

In a preferred manner, the use of the invention is also expedient in the case of a crankshaft and/or camshaft of an internal-combustion engine, preferably a diesel engine or gasoline engine, as a rotatable part because, in a simple fashion, the introduced vibrations and of these particularly the sound emission inside an occupant compartment of a combustion-engine-driven vehicle can be influenced. The influencing of the noise level, which the operator of a vehicle perceives, in particular, as disturbing and which comes at least partially from the engine, takes place at the site where it arises and not, as previously customary, only at the site where the operator perceives it. In an advantageous manner, this reduces, among other things, the expenditures with respect to the electronic control system and the equipment construction (microphone, loudspeaker and the like).

In addition. The is explained in detail by means of embodiments illustrated in the drawings.

DETAILED DESCRIPTION OF THE PREFERRED EMBODIMENTS

Figure 1:
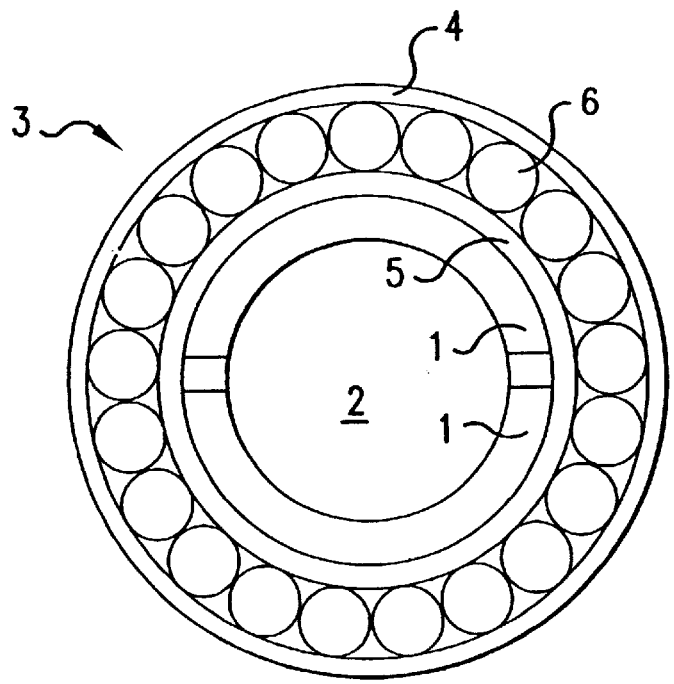
FIG. 1 is a view of a shaft bearing with a two-part radial adjusting unit arranged on the interior side.

FIG. 1 illustrates a shaft bearing 3 in the manner of a ball roller bearing. However, the invention is not limited to roller bearings but also concerns all possible shaft bearings, such as ball bearings, roller bearings, slide bearings, and the like. The shaft bearing according to FIG. 1 has an outer shell 4, an inner shell 5, a radial adjusting unit 1 arranged on the interior side of the inner shell 5, as well as balls 6 rollably arranged between the outer shell 4 and the inner shell 5.

The radial adjusting unit 1 is formed by two piezoelements constructed as half shells. The half-shell piezoelements of the radial adjusting unit 1 are spaced from one another on the interior side of the inner shell 5 so that, in the inoperative condition, they rest particularly without play on the outer surface of the rotatable part 2.

The half-shell piezoelements of the radial adjusting unit 1 are advantageously electrically contacted in that the shaft is grounded and the opposite, preferably positive potential is applied to the inner shell 5 of the roller bearing 3. The positive potential can preferably be applied to the whole shaft bearing 3, in which case the shaft bearing 3 should be electrically insulated with respect to its receiving component 7 and its other environment.

As the result of the electric contacting of the shaft bearing 3, the half-shell piezoelements of the radial adjusting unit 1 can be radially extended by the application an electric direct voltage, whereby the contact pressure onto the shaft and the therefore previously existing clamping conditions are changed.

The change of the clamping conditions is accompanied by, among other things, an off-tuning of the inherent vibrations of the rotatable part 2. Because of the change of the geometry of the half-shell piezoelements of the radial adjusting unit 1, for example, also a possibly occurring play can be compensated.

Furthermore, the half-shell piezoelements of the radial adjusting unit 1, in the event of a vibration occurring in the rotatable part 2, can be excited by the application of an alternating voltage to carry out a secondary vibration. The secondary vibration can be caused to enter an interference with the occurring vibration, particularly a natural vibration of the rotatable part 2, whereby the occurring vibration is changed and particularly damped.

The secondary vibration is expediently changed as a function of the occurring vibration. For this purpose, it is useful to sense the occurring vibration, to analyze it by means of a mathematical algorithm—such as a Fourier transformation—and, as a result, by means of correspondingly generated sets of data, excite the half-shell piezoelements of the radial adjusting unit 1 to carry out a corresponding secondary vibration.

A high-expenditure electronic sensing and/or analyzing system for the occurring vibration can be eliminated in a special manner if the sets of data for controlling the clamping conditions and/or the secondary vibration are taken from a preferably electronic data memory, in which data sets, which had previously been determined by examples, are filed. In particular, the retrieval of a respective data set takes place as a function of a parameter correlated with the operation of the rotatable part 2.

In other cases, it is expedient to determine the occurring vibrations and to select the data sets for the secondary vibration corresponding to the determined vibration.

If the rotatable part 2 is a rotating rotatable part, particularly a camshaft and/or a crankshaft of an internal-combustion engine, it is useful to change the clamping conditions and/or the secondary vibrations as a function particularly of the rotational speed and/or of the crank angle or camshaft angle of the internal-combustion engine.

In a useful manner, the radial adjustment of the radial adjusting unit 1 and the artificial generating of the secondary vibration can be connected with one another, whereby the arrangement or the method according to the invention becomes more flexible.

The combination of these two usage possibilities of a shaft bearing 3 according to the invention can take place in that an alternating voltage with an additional direct voltage (a so-called offset voltage) is used as the electric voltage.

The offset voltage controls the radial course or the radial contact pressure of the half-shell piezoelements of the radial adjusting unit 1, while the alternating voltage excites the piezoelements of the radial adjusting unit 1 to carry out the secondary vibration. As a result, the half-shell piezoelements of the radial adjusting unit 1 carry out a secondary vibration whose zero point is arranged at the site which is determined by the offset voltage.

In the case of a shaft bearing 3 which is fixedly clamped in on the interior and exterior side, a piezoelement of the radial adjusting element 1 can at most physically expand to a slight degree so that in this case the secondary vibrations are pressure vibrations, thus radial power fluxes, which are transmitted to the rotatable part 2. This also changes the clamping conditions of the rotatable part 2.

Furthermore, the clamping conditions and/or the secondary vibrations can be changed in a special manner also as a function of the temperature of the rotatable part 2 and/or of the shaft bearing 3.

Figure 2:
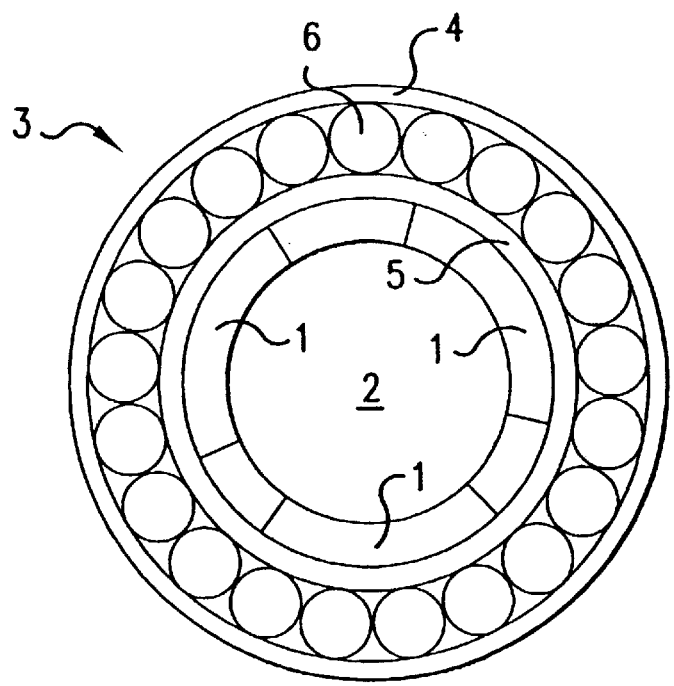
FIG. 2 is a view of a shaft bearing with a three-part radial adjusting unit arranged on the interior side.

FIG. 2 illustrates another shaft bearing 3 which is similar to that according to FIG. 1. The difference between these two shaft bearings consists of the fact that here the radial adjusting unit 1 has three circular-shell-shaped piezoelements.

Figure 3:
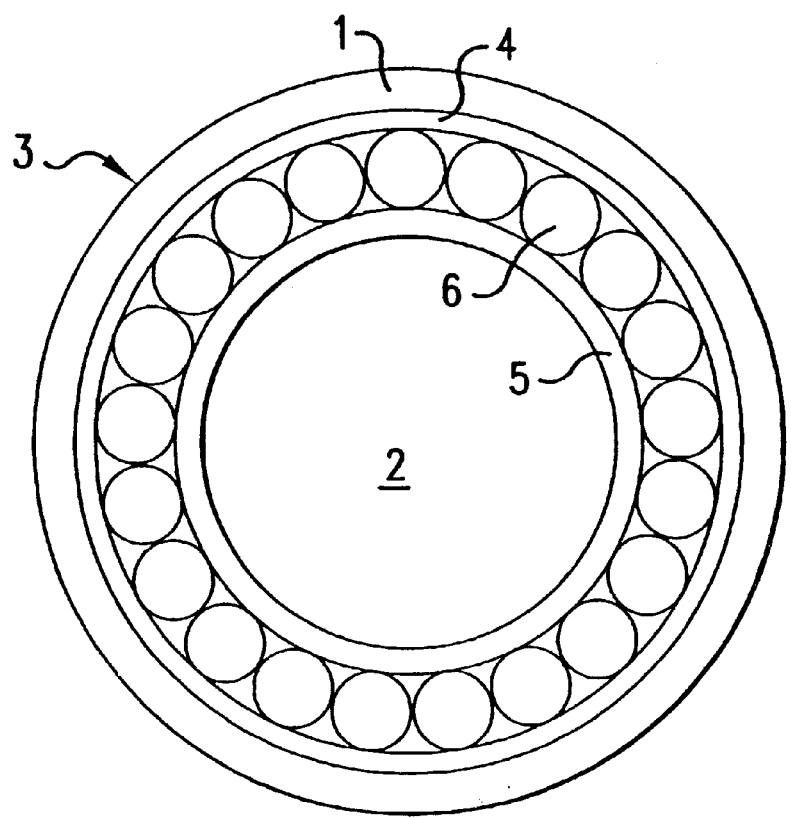
FIG. 3 is a view of a shaft bearing with a one-part radial adjusting unit arranged on the exterior side.

FIG. 3 shows another shaft bearing 3. In the case of this shaft bearing 3, the radial adjusting unit 1 is arranged on the outer surface of the outer shell 4 and has a ring-shaped piezoelement which optionally may also have an axially extending (not shown) joint.

The shaft bearing 3 is arranged such on the rotatable part 2 that its axis of symmetry extends with an axis identical to that of the axis of rotation of the rotatable part 2. Furthermore, the shaft bearing 3 is supported on its two outer surfaces; that is, the inner side of the inner shell 5 rests on the outer surface of the rotatable part 2 and the ring outer side of the piezoelement of the radial adjusting unit 1 rests on a component 7 which surrounds it at least in areas.

For the electric contacting, the ring interior side of the piezoelement of the radial adjusting unit 1 facing the outer surface of the outer shell 4 is grounded and the ring exterior side of the piezoelement of the radial adjusting unit 1 is applied to the positive potential.

If a radial play occurs between the component 7 surrounding the shaft bearing 3 and/or between the shaft bearing 3 and the rotatable part 2, an electric voltage is applied to the piezoelement of the radial adjusting unit 1. As the result of the electric (direct) voltage, the radial course of the piezoelement of the radial adjusting unit 1 changes. The play is therefore at least reduced. In a useful manner, the electric voltage is selected such that the change of the radial course corresponds to the extent of the play.

If the shaft bearing 3 is placed without play on its two axially parallel outer surfaces, the radial course of the of the piezoelement of the radial adjusting unit 1 can change at most minimally. In this case, the pressure onto the rotatable part 2 and the component 7 surrounding the shaft bearing 3 is increased and the clamping conditions are changed.

If the electric voltage has an alternating-voltage fraction, as a result—as described above—secondary vibrations in the form of pressure vibrations connected with high forces can be transmitted to the rotatable part 2 and to the component 7 surrounding the shaft bearing 3.

Figure 4:
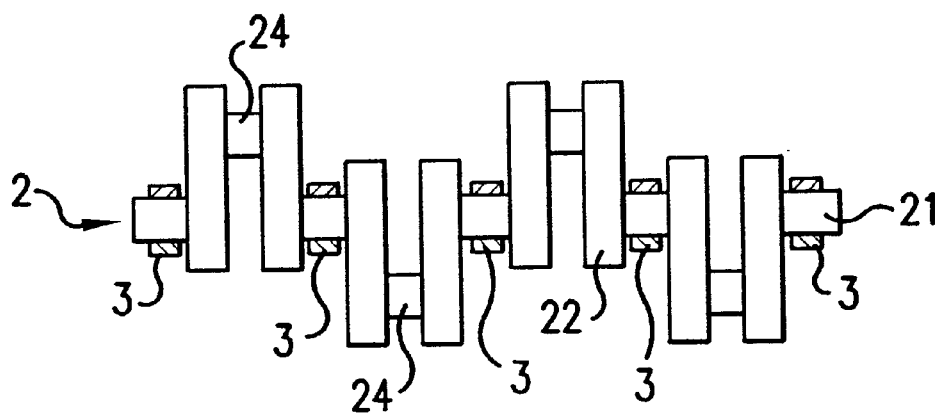
FIG. 4 is a view of a crankshaft with several shaft bearings according to the invention.

FIG. 4 illustrates a crankshaft with shaft bearings mounted thereon as a rotatable part. The crankshaft has two main bearing journals 21 arranged axially on the exterior side. A main bearing journal 21 is followed in the direction of the axis of rotation by two crankshaft webs 22 between which a bearing journal 23 is arranged. The second crankshaft web 22 is followed by a connecting rod bearing journal 24 which is radially offset with respect to the axis of rotation of the crankshaft. This is again followed by a crankshaft web 22, a bearing journal 23, a crankshaft web 22, a connecting rod bearing journal 23, etc. The shaft bearings 3 according to the invention are arranged on the main bearing journals 21 and on the bearing journals 23. In a preferred manner, the shaft bearings 3 can be controlled separately from one another, whereby the variation possibilities are achieved of an influence on the rotatable part taking place by the shaft bearings.

For example, in the case of a crankshaft, it is useful to use, instead of roller bearings, so-called slide bearings at least on the bearing journals. In this case, the piezoelements may form the slide bearings. In an expedient further development, these piezoelements, which are used as slide bearings and simultaneously as a radial adjusting unit 1, may have a sliding layer on their surface facing the shaft. The sliding layer, in turn, expediently has a dry lubricant, preferably molybdenum sulfide ($MoS_2$) and particularly preferably boric acid ($H_3BO_3$).

Figure 5:
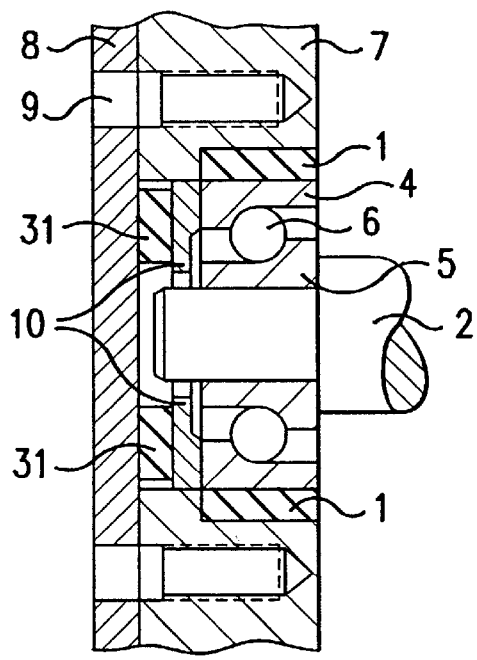
FIG. 5 is a detailed drawing of a rotatable part which is held on the face side in a surrounding component 7 and has an axial and radial adjusting unit arranged on the face side.

FIG. 5 illustrates a face-side receiving arrangement of a rotatable part 2 in a surrounding component 7. The rotatable part 2 has a stop at which the radius changes abruptly. The stop of the rotatable part rests directly on the inner ring 5 of the shaft bearing and is therefore arranged in the axial direction without play in the shaft bearing. The shaft bearing has an outer shell 4, an inner shell 5, as well as balls 6 rollably arranged between the outer shell 4 and the inner shell 5.

With respect to the function of the radial adjusting unit 1, the present shaft bearing corresponds to that of FIG. 3. The method of operation of this shaft bearing will therefore not discussed here again in detail.

The inner shell 5 and the outer shell 4 each have only one contact surface or sliding surface for the balls 6 which is situated transversely with respect to their axis of rotation. As the result of the construction, the inner shell 5 can be axially displaced to a certain extent relative to the outer shell 6.

In the direction of the face side of the rotatable part 2, a counterring 10 rests against the outer shell 6 of the shaft bearing. On the other side of the counterring 10, a ring-shaped piezoelement rests against the counterring, which piezoelement forms the axial adjusting unit 31. A cover plate 8, in turn, rests on the piezoelement on the other side of the piezoelement. The cover plate 8 is connected by means of screws 9 with the component 7 which receives the shaft bearing and surrounds it. As the result of this construction, the axial adjusting unit 31 is supported on its one side against the surrounding component 7 and, on its other side, against the outer shell 4 of the shaft bearing.

In this case, the material of the piezoelements of the axial adjusting unit 31 is selected such that the axial dimension of the piezoelements is enlarged when an electric voltage is applied. In the case of an enlargement of the axial dimension of the piezoelements, the counterring 10 is pressed more in the direction of the outer shell 4 and a corresponding force is transmitted. From the outer shell 4, the force is transmitted by way of the balls 6 to the inner shell 5 and therefrom to the stop of the rotatable part 2. As the result of this power flux acting in the axial direction, the axial clamping condition of the rotatable part 2 is changed and the resonance frequency of the rotatable part 2 is detuned so that the transmission function is changed in a targeted, preferably noise-minimizing manner.

In the case of an existing axial play, the whole arrangement is pushed in the above-described case by way of the counterring in the direction of the stop of the rotatable part 2 and the axial play is at least reduced. As the result of the change of the geometry of the piezoelements of the axial adjusting unit 1, a possibly occurring axial play can therefore also be compensated.

Furthermore, the piezoelements of the axial adjusting unit 31, in the event of a vibration occurring in the rotatable part 2, can be excited by the application of an alternating voltage to carry out a secondary vibration. The secondary vibration is transmitted to the rotatable part 2 by way of the components conducting the power flux and is caused to enter an interference with the occurring vibration, particularly a natural vibration of the rotatable part 2. By means of the interference with the secondary vibrations, the vibration occurring at the rotatable part is changed and particularly damped.

The secondary vibration is expediently changed as a function of the occurring vibration. For this purpose, it is useful to sense the occurring vibration, to analyze it by means of a mathematical algorithm—such as a Fourier transformation—and, as a result, by means of correspondingly generated sets of data, excite the half-shell piezoelements of the axial adjusting unit 1 to carry out a corresponding secondary vibration.

Figure 6:
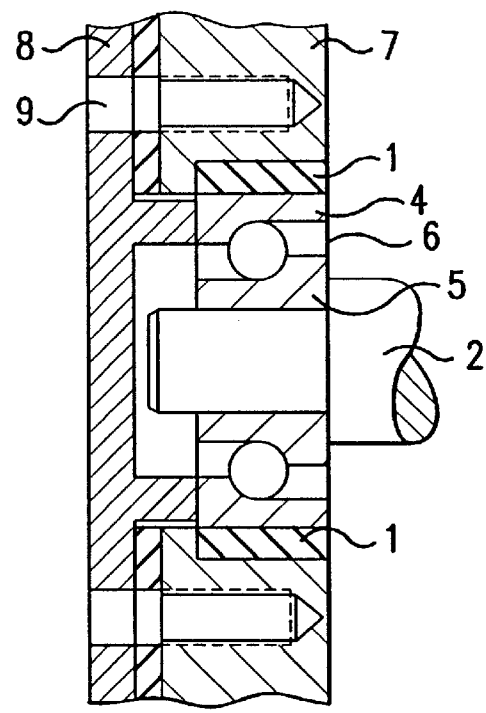
FIG. 6 is another detailed drawing of a rotatable part which is held on the face side in a surrounding component 7 and has an axial and radial adjusting unit arranged on the face side.

FIG. 6 shows another embodiment of a face-side receiving arrangement of a rotatable part 2 in a surrounding component 7. The shaft bearing present here corresponds to that of FIG. 5. The rotatable part 2 has a stop at which the radius changes abruptly. The stop of the rotatable part rests directly on the inner ring 5 of the shaft bearing and, as a result, is arranged in the axial direction without play in the shaft bearing.

However, in contrast to the previous embodiment, the former counterring and the cover plate 8 are combined to form a single component, the function of the former counterring now being taken over by a type of dome which projects from the cover plate 8 in the direction of the shaft bearing and rests by means of its face side on the outer shell 4 of the shaft bearing. The axial adjusting unit 31 is formed by piezoelements which are arranged in the area of the screws 9 in the manner of a washer between the cover plate 8 and the surrounding component 7.

In this case, the material of the piezoelements of the axial adjusting unit 31 is selected such that the axial dimension of the piezoelements is reduced when an electric voltage is applied, whereby the screws 9 tightened with prestress press the cover plate 8 more in the direction of the rotatable part. This force is transmitted by way of the dome to the outer shell 4. From the outer shell 4, the force is transmitted by way of the balls 6 to the inner shell 5 and therefrom to the stop of the rotatable part 2. As the result of this power flux acting in the axial direction, the axial clamping condition of the rotatable part 2 is changed and the resonance frequency of the rotatable part 2 is detuned so that also here the transmission function is changed in a targeted, preferably noise-minimizing manner.

In the case of an existing axial play, the whole arrangement is pushed in the above-described case by way of the dome in the direction of the stop of the rotatable part 2 and the axial play is at least reduced. As the result of the change of the geometry of the piezoelements of the axial adjusting unit 1, a possibly occurring axial play can therefore also be compensated.

Figure 7:
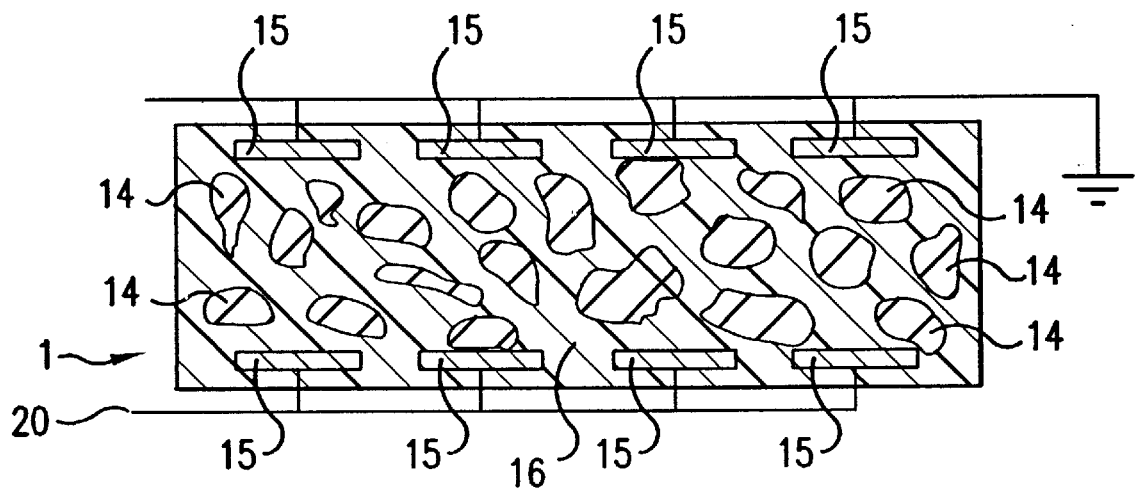
FIG. 7 is a view of an axial and radial adjusting unit which is constructed in the manner of a seal with integrated piezoelements.
Figure 8:
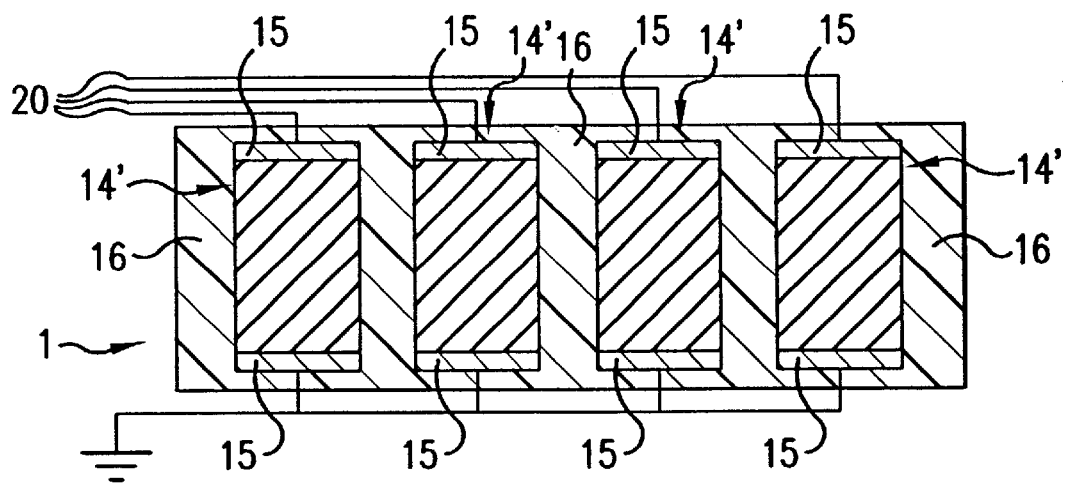
FIG. 8 is a view of an axial and radial adjusting unit which is constructed in the manner of a seal with integrated and oriented piezoelements.
Figure 9:
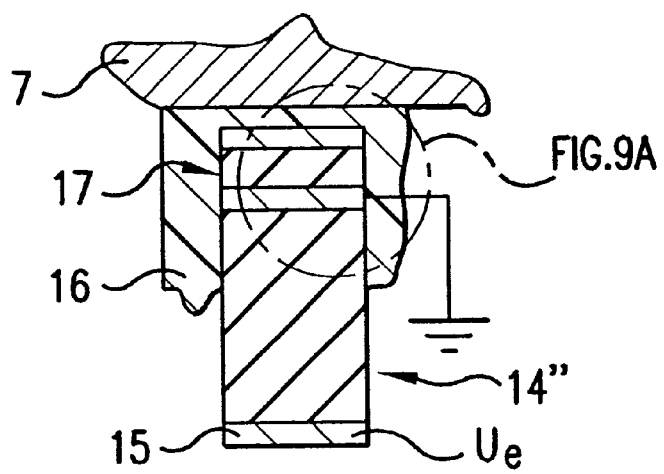
FIG. 9 is a view of an axial and radial adjusting unit and an enlargement of its cutout, the radial adjusting unit being constructed in the manner of a seal with integrated and oriented piezoelements as well as with integrated contacts.
Figure 9A:
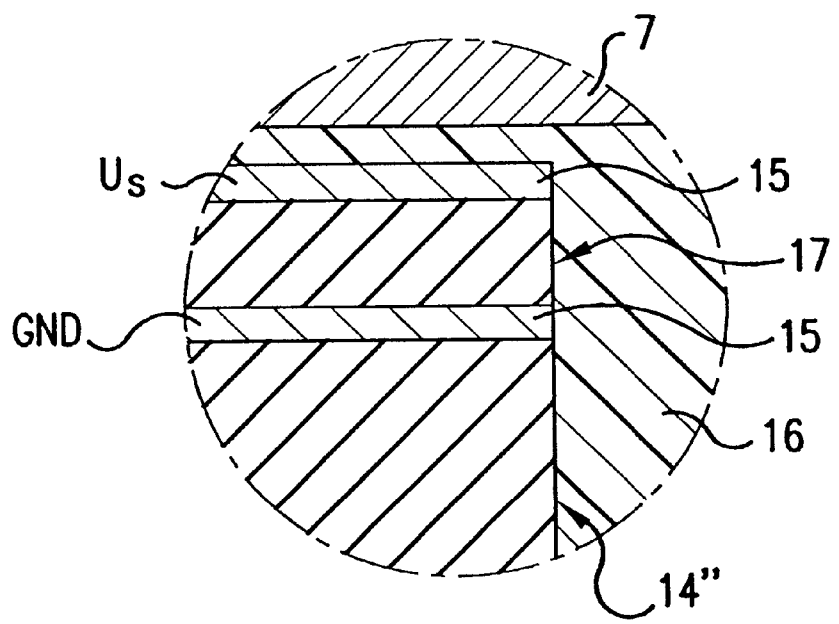

Instead of the radial adjusting units 1 illustrated in FIGS. 1 to 3, which are always formed completely of piezoelements, they can in a special manner also be constructed as a seal, in which the piezoelements 14, 14', 14" are arranged in a plastic matrix 6. Corresponding embodiments of these (active) seals are illustrated in FIGS. 7 to 9. In the case of these seals, it is advantageous that such an axial and radial adjusting units 1, in addition to the sealing effect, also exercise a protective effect on the piezoelements 14, 14', 14" which are the result of the plastic matrix 16 of the seal surrounding them.

FIG. 7 shows a seal of an axial and radial adjusting unit 1 with a matrix 16 consisting of a preferably electrically conductive plastic material in which several piezoelements 14 of any size, orientation and physical design are embedded. Such an arrangement is generally called a 0-3-piezoceramics-polymer-composite. In the area of the wall of the seal, electric contacts 15 are advantageously provided which are connected by electric control lines 20 with a control unit (not shown).

By means of the electric contacts 15, the individual piezoelements 14 can, on the one hand, be triggered in a targeted manner and, on the other hand, it is possible to tap electric voltage, which can be generated, for example, by the fact that vibrations transmitted by a rotatable part 2 exercise a pressure on the piezoelements 14 and deform them.

In a simple case, the electric contacts 15 in the case of a seal may also be eliminated. Although, in this case, a deformation of the piezoelements 14 resulting from transmitted vibrations also leads to an electric voltage, the electric voltage is then converted here to a heating of the plastic matrix 16 of the seal, whereby the system is also damped.

FIG. 8 illustrates another active seal of an axial and radial adjusting unit 1 with a plastic matrix 16 in which several piezoelements 14' are embedded. In contrast to the embodiment according to FIG. 7, these piezoelements 14' are of a defined size and shape and, in addition, are arranged in an oriented manner. Such an arrangement is generally called a 1-3-piezoceramics-polymer composite.

Depending on the advantages in the respective application, the individual piezoelements 4' may, for example, be massive and/or be formed of several stacked layers of individual plies of particularly foil-type and/or disk-type piezoceramics. In contrast to the massive construction of piezoelements, in the case of the multi-layer systems, the tension decreases while the stress and the active surface are the same, whereas the current is increased.

In the area of the wall of the seal, electric contacts 15 are also arranged which are also connected by electric control lines 20 with a control unit (not shown). In contrast to the seal according to FIG. 6, in the case of the seal according to FIG. 7, each piezoelement 14' is electrically contacted individually and can therefore also be individually triggered in a separate manner.

By way of the electric contacts 15, the individual piezoelements 14' can be excited in a targeted manner to carry out secondary vibrations with desired frequencies and amplitudes. The secondary vibrations may be caused to enter an interference with the vibrations transmitted from the rotatable part 2 and/or can be superimposed on these. In the case of a negative interference, the noises previously perceived without this influence can at least be reduced.

The piezoelements 14' of the seal of an axial and radial adjusting unit 1 are preferably constructed in the manner of piezostacks and/or are arranged in a lamella-type manner and particularly aligned behind one another in the seal.

During the manufacturing of the seal, the thus arranged piezoelements 14' are expediently electrically contacted before they are embedded in the plastic material forming the matrix 16 of the seal. So that the seal of a radial adjusting unit 1 continues to fulfill its normal purpose, the plastic material forming the matrix 15 is preferably manufactured of a polymer and particularly of an elastomer.

FIG. 9 illustrates an active seal of an axial and radial adjusting unit 1 with a plastic matrix 16 in which several piezoelements 14" are embedded with assigned piezoelectric sensors 17. With respect to the construction and the oriented arrangement, the piezoelements 14" are largely similar to those according to FIG. 8.

However, in the direction of their active axis, a preferably piezoelectric sensor 17 is arranged behind them. The sensor 17 has a common and an additional electric contact 15. The common contact 15, which is arranged between the piezoelement 14" and the sensor 17, is expediently grounded or applied to an electric zero potential.

By way of the electric contacts 15, the individual piezoelements 14" can be excited in a targeted manner to carry out secondary vibrations with desired frequencies and amplitudes. The secondary vibrations can be caused to interfere with the vibrations transmitted by the rotatable part 2 and/or can be superimposed on these.

Advantageously, in the case of such a seal of an axial and radial adjusting unit 1, by means of the sensor 17, a residual vibration remaining after a desired excitation of the piezoelements 14" can be determined and correspondingly controlled. Together with the pertaining electronic system, this piezo/sensor element 4" therefore forms a control circuit. For this reason, it is, among other things, advantageous to arrange the sensor 17 in the power flux direction and/or in parallel to the deflection direction of the amplitude to be expected or of the modes of the transmitted vibration behind the excitable piezoelement 14".

As the result of the individual electric contacting of each sensor 17 and of the respective piezoelements 14", the determination of the residual vibration and the introduction of the secondary vibration can take place with a good resolution and flexibility.

What is claimed is:

1. Method for changing the clamping conditions of a rotatable part, which is rotatably disposed in the shaft bearing, and in the case of which the axis of rotation of the rotatable part is arranged axially identically with the axis of rotation of the shaft bearing, characterized in that the axial and radial clamping conditions are changed between the shaft bearing (3) and a rotatable part (2) of the engine which is rotatably held in the shaft bearing (3), in that the clamping conditions between the rotatable part (2) and the shaft bearing (3) are changed in a controlled manner, in that the clamping conditions between the rotatable part (2) and the shaft bearing (3) are changed as a function of vibrations which occur at the rotatable part (2), and in that, as the result of the change of the clamping conditions, the transmission function of the vibrations, particularly of vibrations generating sound waves, existing between the rotatable part (2) and the shaft bearing (3) or a component contacting the shaft bearing, is changed.

2. Method according to claim 1, characterized in that, for changing the clamping conditions, the radial dimension of a radial adjusting unit (1) having a piezoelectrically active material and of an axial adjusting unit (31) having a piezoelectrically active material is changed.

3. Method according to claim 1, characterized in that the clamping conditions are changed as a function of a parameter of the engine, particularly of the rotational speed and/or the crank angle of an internal-combustion engine.

4. Method according to claim 1, characterized in that the data for controlling the clamping conditions are retrieved from a set of data filed in a data memory.

5. Rotatable part, which is rotatably disposed in a shaft bearing and whose axis of rotation is arranged axially identically with the axis of rotation or symmetry of the shaft bearing, and having an adjusting unit for compensating a play of the rotatable part, characterized in that the adjusting unit has a radial adjusting unit (1) and an axial adjusting unit (31), in that the radial adjusting unit (1) has a piezoelectrically active material, in that, by means of the radial adjusting unit (1), the effective radial dimension of the area of the rotatable part (2) to be held and/or the radial contact pressure onto the rotatable part (2) can be changed as a controllably reversible manner at least between two measurements, in that the axial adjusting unit (31) has a piezoelectrically active material, and in that, by means of the axial adjusting unit (31), the effective axial dimension in the area of the rotatable part (2) to be held and/or the axial contact pressure onto the rotatable part (2) can be changed in a controllably reversible manner at least between two measurements.

6. Rotatable part according to claim 5, characterized in that the radial adjusting unit (1) is arranged directly on the outer circumference of the rotatable part (2).

7. Rotatable part according to claim 5, characterized in that the radial adjusting unit (1) is arranged on the outer circumference of the shaft bearing (3).

8. Rotatable part according to claim 5 characterized in that the radial adjusting unit (1) is constructed as a divided shell.

9. Rotatable part according to claim 5, characterized in that the rotatable part (2) is a crankshaft or a camshaft of a diesel or gasoline engine.

10. Rotatable part according to claim 5, characterized in that the rotatable part (2) is a rotating system element, preferably a shaft or a rotator of an electric motor.

11. Rotatable part according to claim 5, characterized in that the rotatable part (2) is a rotating system element of a propeller or a jet engine.

* * * * *